United States Patent
Shindo et al.

[15] 3,652,263
[45] Mar. 28, 1972

[54] DIRECT PRODUCTION METHOD FOR MEDIUM- AND LOW-CARBON FERROMANGANESE

[72] Inventors: Hisao Shindo, Tokyo; Yoshishige Nagoya, Hachinoe-shi; Takashi Takeuchi, Hachinoe-shi; Kosuke Murai, Hachinoe-shi, all of Japan

[73] Assignee: Taiheiyo Kinzoku Kabushiki Kaisha Co., Ltd., Tokyo, Japan

[22] Filed: Apr. 30, 1968

[21] Appl. No.: 725,532

[52] U.S. Cl. .................................75/80, 75/133, 75/135
[51] Int. Cl. ....................C22b 1/00, C22b 9/10, C22b 47/00
[58] Field of Search .................................75/129, 133.5, 80

[56] References Cited

UNITED STATES PATENTS

| | | | |
|---|---|---|---|
| 3,074,793 | 1/1963 | Kuhlmann | 75/133.5 |
| 3,347,664 | 10/1967 | Bauer | 75/133 |
| 3,360,253 | 12/1967 | Mori | 266/34 |
| 3,395,011 | 7/1968 | Dery | 75/133.5 |
| 3,433,628 | 3/1969 | Urane | 75/80 |
| 3,551,141 | 12/1970 | Matsuura | 75/80 |

Primary Examiner—L. Dewayne Rutledge
Assistant Examiner—Joseph E. Legru
Attorney—Ward, McElhannon, Brooks and Fitzpatrick

[57] ABSTRACT

A production method for medium- and low- carbon ferromanganese directly from silico-manganese, which method comprises charging molten silico-manganese, heated manganese ore and slagging materials (or, if necessary, with an added reducing agent) into a reaction vessel, giving a horizontal eccentric circular motion to said reaction vessel, and oxidizing and removing silicon as well as reducing manganese.

9 Claims, No Drawings

DIRECT PRODUCTION METHOD FOR MEDIUM- AND LOW-CARBON FERROMANGANESE

BRIEF SUMMARY OF THE INVENTION

This invention relates to a direct production method for medium- and low- carbon ferromanganese, wherein molten silico-manganese, heated iron-containing manganese ore and slagging materials, such as quicklime, fluorspar, etc., or, as occasion demands, a reducing agent, such as ferrosilicon, etc., are first charged into a reaction vessel which is lined with refractory material. This vessel is then given a horizontal eccentric circular motion to react the silicon contained in the silico-manganese, with the oxygen contained in the manganese oxide present in the ore, and to remove its oxide, as well as to reduce manganese, thus producing medium- or low- carbon ferromanganese of desired composition directly from the silico-manganese.

DETAILED DESCRIPTION

In general, in the production of medium- and low- carbon ferromanganese, in a first stage, coke is blended, as a reducing agent, with low grade manganese ore and the slag which is produced during the production of high-carbon ferromanganese is then subjected to reducing melting in an electric furnace to produce silico-manganese. In a second stage, this silico-manganese, high grade manganese ore and quicklime are blended in the solid state in an electric furnace and melted to effect desiliconizing and the reduction of manganese. However, much loss on volatilization is caused by this process and the manganese content in the slag is of the order of 22 to 24 percent, resulting in a low yield of manganese. Additionally, about 1,600 KWH of power is required, making the cost for refining considerably high.

The present invention is made as the result of various researches, wherein silico-manganese produced at the first process is, in its molten state charged, together with heated manganese ore and slagging material, such as quicklime, fluorspar, etc., or, as occasion demands, with reducing agent, such as ferrosilicon, etc., into a reaction vessel lined with refractory material. This reaction vessel is then given a horizontal eccentric circular motion without supplying any heat from outside to effect sufficient mixing and agitation for a sufficient time, thus oxidizing and removing silicon in the silico-manganese as well as reducing the manganese in the manganese ore. When said reactions of oxidizing and reducing draw near to an equilibrium state and become weak, the slag is skimmed off. Repetition of the process can be effected as desired to achieve substantially complete consumption of the silicon. In such a case, desiliconizing of the silico-manganese is almost completely effected and the grade of manganese of molten metal rises up to the predetermined value.

The skimmed slag has a low manganese content when the silicon content of the molten bath is high, but has considerably high manganese content when silicon content of molten bath is low, so that the reducing agent such as ferro-silicon, etc., is used preferably before the slag is skimmed off or the slag is recovered intact to be used as manganese source.

In the present invention, contrary to the production of medium- or low- carbon ferromanganese by smelting in an electric furnace, localized high temperatures are avoided in the molten bath, so that the volatilization losses of manganese are very small and no carbon is added from electrodes. Therefore, it is an added advantage of the invention that the silico-manganese to be used may have somewhat higher carbon content than is normally employed. Further, it has been found that the continuous mixing and agitation of molten bath and addition materials by means of horizontal eccentric circular motion of the reaction vessel produces effective contact action between said molten bath and addition materials and causes prompt approach to the equilibrium state. As a result of the oxidizing reaction heat of silicon in molten silico-manganese, the addition materials will be completely melted without supplying any heat from outside, thus making it possible to produce medium- or low- carbon ferromanganese of desired grade in a very short time and far more economically than in the process with electric furnace.

The reaction vessel to be used in the present invention is lined with refractory material and does not rotate around its vertical central axis, but performs a horizontal eccentric motion with an eccentricity preferably of small circle while the vessel is drawing a small circle. The motion of bath in the vessel becomes a special wave motion by a certain number of revolutions and the state of agitation becomes very good. Namely, the contact between the molten bath and the addition materials is effected continuously and in very good condition, so that the chemical reaction proceeds promptly and manganese in the manganese ore is reduced in a short time, while silicon in the molten bath is oxidized and removed.

An outline of the production method according to the present invention will be mentioned as follows.

In compliance with the desired content of each component of medium- and low- carbon ferromanganese to be produced, the composition of silico-manganese, giving especially suitable results in the present process, is as follows: Mn: 50 70%, Si: 15 40%, C: 0.1 2.0%. This silico-manganese is available from the slag of an electric melting process involving reduction and smelting with coke as reducing agent, in the production of low grade manganese ore (for instance, Mn content of 35%) and of high carbon ferromanganese. Tapped silico-manganese is received by a ladle and after removing slag therefrom it is charged into a reaction vessel lined with refractory material.

On the other hand, high grade manganese ore and slagging materials, such as quicklime, fluorspar, etc., which are preliminarily heated (preferably by making use of electric smelting furnace gas or heavy oil) until the water of crystallization is removed, are added to the reaction vessel, preferably in proper amounts thereof respectively, to provide sufficient quantity of ore to combine with available silicon in the reactor; the vessel is then given a horizontal eccentric circular motion for 5 to 10 minutes with the optimum number of revolutions (for instance, 45 r.p.m.) for mixing and agitation in compliance with the quantity of molten bath. Alternatively, one portion of high grade manganese ore and slagging materials, such as quicklime, fluorspar, etc., are preliminarily heated in a reaction vessel, into which molten silico-manganese may be charged little by little.

During this process, manganese oxide in the manganese ore is reduced by silicon in the silico-manganese, and silicic acid produced by this reaction combines with charged quicklime. When manganese oxide in the manganese ore is decreased by silicon in the molten bath until it approaches the equilibrium state, the slag is skimmed off, and fresh heated manganese ore and slagging material are newly added, and eccentric agitation given for 5 to 10 minutes. By repeating this operation as desired, medium- or low- carbon ferromanganese of desired composition is produced. Further, when silicon in the molten bath is decreased, auxiliary reducing agents, such as ferrosilicon, and the like can be added in sufficient quantity before skimming the slag, thereby to effect recovery of the manganese therein.

The method according to the present invention will be explained with reference to some examples, as follows.

EXAMPLE 1

Production of medium-carbon ferromanganese:
The composition of molten silico-manganese used in this example was Mn: 62.1%, C: 1.85%, Si: 16.06%, P: 0.13%, Si: 0.02%, and that of high grade manganese ore was Mn: 53.0%, Fe: 3.3%, P: 0.06%, $SiO_2$: 6.5%

Firstly, high grade manganese ore of 2,500 kg., quicklime of 1,000 kg. and fluorspar of 100 kg. were charged in a reaction vessel of 5,000 kg. capacity and were heated by a combustion apparatus for electric smelting furnace gas at about 500° C., into which molten silico-manganese of 3,000 kg., which was tapped from an electric smelting furnace, was charged little by little, at first giving horizontal eccentric circular motion with 10 to 20 r.p.m., while observing the state of reaction the speed was gradually increased, and at least the vessel was operated at 45 r.p.m. for about 10 minutes.

Then the greater part of slag was skimmed off and heated high grade manganese ore of 700 kg., quicklime of 300 kg. and fluorspar of 50 kg. were newly added, then operating as mentioned above, thus silicon in the molten bath was removed until it remained within the standard. Subsequently, the operation was effected for about 5 minutes while adding ferrosilicon powder of 150 kg. little by little, then the molten bath was tapped.

The composition of slag at the time of tapping was MnO: 28.5%, $SiO_2$: 36.5%, CaO: 35.8%, and weight of the product was 3,450 kg. The composition of the product was Mn: 78.5%, C: 1.76%, Si: 0.98%, P: 0.19%, S: 0.01%, thus medium-carbon ferromanganese of good quality was produced.

The charging temperature of molten silico-manganese was 1,400° C., but due to oxidizing heat of silicon, solid addition materials were completely melted without supplying any heat from outside, and the fluidity of produced slag was very good and no difficulty was found in operation.

EXAMPLE 2

Production of low-carbon ferromanganese:

The composition of molten silico-manganese used in this example was Mn: 65.0%, C: 1.40%, Si: 18.0%, P: 0.105%, S: 0.01%, and high grade manganese ore used here was same as that used in Example 1.

Firstly, ferrosilicon of 300 kg., high grade manganese ore of 3,000 kg., quicklime of 1,200 kg. and fluorspar of 100 kg. were charged in a reaction vessel of 5,000 kg. capacity and were heated by a combustion apparatus for electric smelting furnace gas at about 500° C., into which molten silico-manganese of 1,500 kg., which was tapped from an electric smelting furnace, was charged little by little, at first giving a horizontal eccentric circular motion with 10 to 20 r.p.m., while observing the state of reaction the speed was gradually increased, and at last the vessel was operated at 40 r.p.m. for about 10 minutes.

Then, the greater part of slag was skimmed off and heated fresh high grade manganese ore of 500 kg., quicklime of 200 kg. and fluorspar of 50 kg. were newly added, then operating as mentioned above, thus silicon in the molten bath was removed until it remained within the standard, then the molten bath was tapped. The composition of slag at the time of tapping was MnO: 27.5%, $SiO_2$: 36.8%, CaO: 31.5%, and weight of the product was 2,060 kg. The composition of the produce was Mn: 82.1%, C: 0.76%, Si: 0.68%, P: 0.195%, S: 0.01%, thus it came up to the standard for chemical composition of low-carbon ferromanganese. In this case, because no ferrosilicon was used as reducing agent before tapping, the MnO content of the final slag became high, but this was recovered as raw material for silico-manganese.

As mentioned above, according to the method of present invention, the reduction of manganese oxide in manganese ore is effected in a very short time and in a simple operation, and in particular, as shown in the Example 1, if an auxiliary reducing agent, such as ferrosilicon or the like, is used before tapping, the yield of manganese is increased. Thus medium- or low- carbon ferromanganese of desired composition, usually of 2 percent or less of carbon may be produced directly from silico-manganese.

What is claimed is:

1. A method of producing medium and low-carbon ferromanganese containing no more than about 2.0 percent carbon which comprises charging molten carbon-containing silicomanganese and an iron-containing manganese oxide ore preheated to about 500° C. into a reactor vessel, imparting a horizontal eccentric circular motion to said vessel thereby to cause effective contact of the contents thereof to react the silicon present in said vessel with the oxygen in said ore.

2. The method of claim 1 wherein sufficient amounts of said ore are used to cause the substantially complete consumption of the silicon present in said silicomanganese.

3. The method of claim 2 wherein said ore is added intermittently into said vessel.

4. The method according to claim 3 wherein there is additionally present in said reaction vessel at least one slagging material.

5. The method of claim 1 wherein the slagging material is quicklime or fluorspar.

6. The method of claim 4 wherein an auxiliary reducing agent is employed in the reaction vessel.

7. The method of claim 6 wherein the reducing agent is ferrosilicon.

8. The method according to claim 5 wherein the carbon-containing silicomanganese comprises from 15 to 40 percent silicon, 50 to 70 percent manganese and 0.1 to 2.0 percent carbon.

9. The method of claim 1 wherein said vessel is imparting a horizontal eccentric circular motion with 20 to 45 r.p.m. according to the state of reaction.

* * * * *